March 4, 1952 M. W. SELL ET AL 2,587,773
PAN LID TO ABSORB GREASE
Filed April 3, 1950

INVENTORS
Mary W. Sell
Frank A. Sell

Patented Mar. 4, 1952

2,587,773

UNITED STATES PATENT OFFICE 2,587,773

PAN LID TO ABSORB GREASE

Mary W. Sell and Frank A. Sell, Los Angeles, Calif.

Application April 3, 1950, Serial No. 153,506

2 Claims. (Cl. 183—1)

Our invention relates to a new and useful improvement in a pan lid to absorb grease and more particularly to a pan lid which will let the steam out, keep the grease in, thus keeping floors, walls and ceiling free of grease, let the food brown with the lid on the pan, and will eliminate most of the smoke and odor in the room.

An object of the invention is to provide a pan lid which includes a flanged metal ring to fit over the top of a frying pan, a paper disc to fit in the flanged ring and rest on the flange, a metal ring which is hinged to the flanged metal ring so that the metal ring will normally rest on the paper disc to hold the paper disc in place and the metal ring can be raised to replace the paper disc and a handle secured to the flanged metal disc to permit the pan lid to be readily placed upon a frying pan and removed from the frying pan.

Another object of the invention is to provide a new and useful pan lid to absorb grease, which is inexpensive to manufacture, easy to operate, and which will not get out of order.

The above and additional objects are accomplished by such means as are shown in the accompanying drawing, described in the following description and particularly pointed out in the claims.

Figure 5:
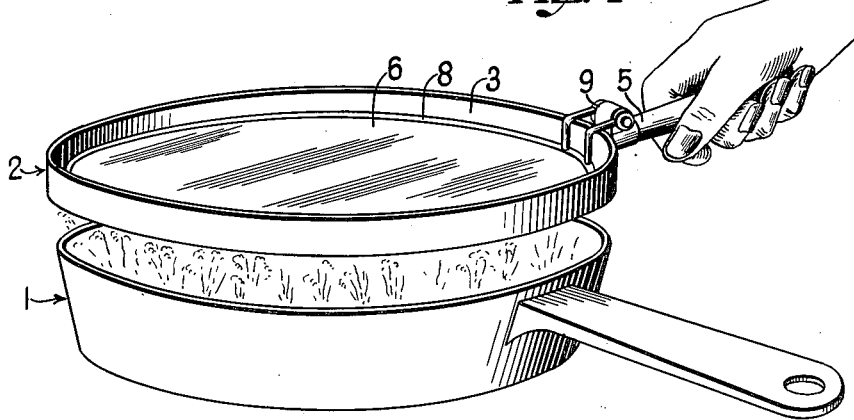
Fig. 5 is a perspective view of a frying pan and our improved pan lid to absorb grease.

In the drawing, Fig. 5 shows a conventional frying pan 1 and our improved pan lid 2. The pan lids can be made in different sizes to fit any standard sized frying pan.

Figure 1:
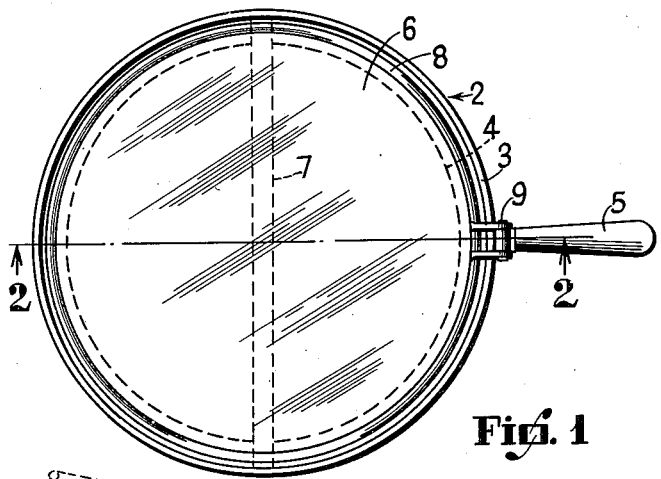
Fig. 1 is a plan view of our improved pan lid to absorb grease.
Figure 3:
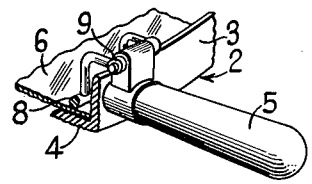
Fig. 3 is a perspective view showing the relation between the flanged metal ring, handle and hinge for the metal ring.
Figure 2:
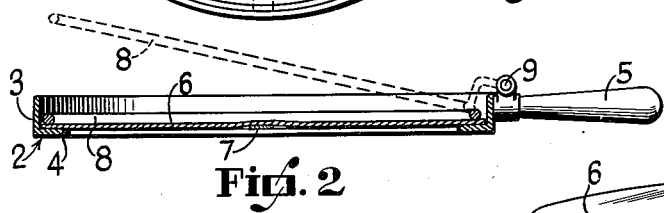
Fig. 2 is a sectional view on line 2—2 of Fig. 1.
Figure 4:
Fig. 4 is a perspective view of a paper disc.

The pan lid includes a flanged metal ring 3, having an inwardly extending flange 4 and a handle 5. The handle may be secured to flanged metal ring 3 in any way such as by a portion of the handle being integral with said flanged metal disc. A disc of grease absorbing material such as paper rests on flange 4. There is also a cross rod 7 extending across the opening at flange 4 to help support the grease absorbing disc and prevent the grease absorbing disc from sagging. A metal ring 8 is hinged to the flanged metal ring 3 by hinge 9. This metal ring 8 is made of a round rod. The metal ring 8 normally rests on the grease absorbing disc 6, keeping said disc in place and keeping disc 6 from curling up. The hinge 9 permits ring 8 to be raised as indicated in Fig. 2 to permit grease absorbing disc 6 to be removed while cleaning the pan lid or while replacing a soiled disc.

In operation ring 8 can be raised, a grease absorbing disc placed on flange 4 and ring 8 allowed to return to the position of Fig. 5. The pan lid can then be placed upon the frying pan while using the frying pan. The grease absorbing disc will absorb grease and moisture and let the food brown without getting grease on the stove, walls or ceiling, and will eliminate most of the smoke and moisture in the room. The grease soaked disc can be removed after using and a new one inserted. Grease absorbing discs can be sold in packages to suit the trade.

In practice we have found that the form our invention illustrated in the drawing and referred to in the above description, is most efficient and practical. Various minor changes in details of construction, proportions and arrangement of the several parts may be resorted to without departing from the scope of our invention.

Having thus described our invention, what we claim and desire to secure by Letters Patent is:

1. A pan lid to absorb grease comprising a metal ring which is shaped to fit the top of a frying pan, an inwardly extending flange in said metal ring, a disc of grease absorbing material resting on said flange, a handle secured to said metal ring, and a metal ring of substantially the same size as said flange and which normally rests on said flange and said disc.

2. The combination of claim 1 including a hinge securing said metal ring to said flanged metal ring to permit said metal ring to be raised while replacing the disc of grease absorbing material.

MARY W. SELL.
FRANK A. SELL.

REFERENCES CITED

The following references are of record in the file of this patent:

UNITED STATES PATENTS

| Number | Name | Date |
|---|---|---|
| 1,098,053 | Porter | May 26, 1914 |
| 1,411,223 | Retzbach | Mar. 28, 1922 |
| 1,942,900 | Peters | Jan. 9, 1934 |
| 2,498,534 | Drum | Feb. 21, 1950 |
| 2,524,554 | White | Oct. 3, 1950 |